United States Patent [19]

Shimogori et al.

[11] 4,082,900

[45] Apr. 4, 1978

[54] CHEMICAL APPARATUS FREE FROM CREVICE CORROSION

[75] Inventors: Kazutoshi Shimogori, Kobe; Hiroshi Sato, Suita; Haruo Tomari, Takasago, all of Japan

[73] Assignee: Kobe Steel, Ltd., Kobe, Japan

[21] Appl. No.: 666,562

[22] Filed: Mar. 15, 1976

[30] Foreign Application Priority Data

Mar. 14, 1975 Japan .................................. 50-31708
Mar. 14, 1975 Japan .................................. 50-31709

[51] Int. Cl.$^2$ ............................................. B32B 15/04
[52] U.S. Cl. .................................... 428/469; 428/472; 428/629; 428/633; 148/31.5; 148/6.3; 23/252 A; 427/226
[58] Field of Search ..................... 427/226, 34, 248 B, 427/34; 148/6.3; 204/37 R, 42, 47, 192 C; 23/252 A; 428/469, 633, 472, 629, 663, 664

[56] References Cited

U.S. PATENT DOCUMENTS 3,778,307   12/1973   Beer et al. .............................. 427/226

FOREIGN PATENT DOCUMENTS 7,324,136   7/1973   Japan .................................. 204/37 R

*Primary Examiner*—Ralph S. Kendall
*Attorney, Agent, or Firm*—Oblon, Fisher, Spivak, McClelland & Maier

[57] ABSTRACT

The invention relates to a novel chemical apparatus, the inner surfaces of which are constituted by titanium material. The invention solves the problems of crevice corrosion and embrittlement of the material by taking in hydrogen, and discloses a method of solving such problems.

The prior-art methods of preventing crevice corrosion in apparatus prepared from titanium metal and also preventing the titanium of such apparatus from becoming fragile due to absorption of hydrogen include a method in which an element of the platinum group is deposited on the surface of the titanium material and difffused thereinto. Alternatively, a Ti-Pd alloy is used as the material of the apparatus. Such methods, however, complicate the manufacture of the apparatus and are also disadvantageous in view of the cost of the great quantity of the platinum group element such as palladium which is consumed.

In accordance with the invention, a mixed oxide layer, composed of an oxide of a platinum group element and an oxide of an anti-corrosion metal is provided on the surface, particularly in the crevices, of the titanium material of apparatus to achieve satisfactory prevention of corrosion and also prevention of hydrogen absorption. This method is very economical compared to the prior-art methods because the required quantity of the platinum group element is very small.

5 Claims, 6 Drawing Figures

CHEMICAL APPARATUS FREE FROM CREVICE CORROSION

BACKGROUND OF THE INVENTION

Titanium and titanium alloys find extensive use as the anti-corrosion material used in chemical plants or like apparatus. It is used in severely corrosive environments or of component parts of such apparatus. However, where non-oxidized solutions such as hydrochloric acid solutions are handled, active dissolution of titanium occurs. Also, where chloride solutions at high temperatures are handled, the problem of abnormal corrosion of inner intersticial parts of apparatus or crevice corrosion has not yet been solved.

Chemical apparatus has crevices in various parts, typical examples of which are flange points of liquid ducts at the gaskets. It will be readily understood that chemicals within the apparatus intrude into such crevice portions. Although the titanium material inherently has excellent corrosion resisting properties, its superficial portions cannot be perfectly immune to corrosion. When a reducing reaction proceeds in superficial portions and crevice portions within the apparatus, the concentration of the dissolved oxygen in such portions is reduced. While the superficial portions within the apparatus are replenished with dissolved oxygen from other portions (for instance central portion within the apparatus), replenishment of the dissolved oxygen in the crevices can hardly be expected. Consequently, oxygen concentration is reduced in effect only in the crevice portion, giving rise to the formation of a so-called oxygen concentration cell with the crevice portion acting as anode inducing an electro-chemical reaction represented as

Thus, there results an increase in hydrogen ion concentration in the concentration of chloride ions in the crevice portion which cause the reaction as represented by

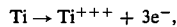

to occur, thus leading to abnormal corrosion of the crevice surface. In this case, although the majority of the inner surfaces of the apparatus are free from corrosion, leakage of process material from crevice portions, for instance pipe joints, is liable to result. This drastically lowers the safety of the entire chemical apparatus.

Known methods of preventing such corrosion include:
(1) using a titanium alloy containing 0.1 to 0.2 percent of palladium; and
(2) in which a platinum group element is deposited on the surface of the titanium material with or without subsequent diffusing treatment. However, the first method is economically disadvantageous because the Ti-Pd alloy uses a great quantity of expensive palladium, while the second method dictates complications of the manufacture of the apparatus, as well as calling for the consumption of a great quantity of the platinum group element.

The titanium material also has another drawback in that it tends to become embrittled by absorbing hydrogen under high-temperature, high-pressure conditions. Under such circumstances the index of hydrogen absorption is high since generation of hydrogen due to corrosion reactions is highly possible, and this problem has recently become important. This tendency of the titanium material to become fragile due to hydrogen absorption is said to be attributable to the facts that hydrogen atoms immediately after generation in the cathode region are very apt to react with titanium and that the resultant hydride of titanium is very fragile. In order to prevent this absorption of hydrogen into titanium, it has been proposed to:

(1) deposit a metal which is potentially nobler than titanium, for instance platinum and palladium, on titanium; or
(2) subject the titanium material to anodizing or chemical oxidation treatment with chromic acid solutions.

The former method is economically not practical for the same reason as mentioned earlier, and also the range of its application is limited. In the second method, the oxide layer produced is reduced in a short period of time, so that it is impossible to expect a great effect of preventing hydrogen absorption.

SUMMARY OF THE INVENTION

The present invention seeks to solve the afore-mentioned problems. Its primary object is to provide a chemical apparatus, the crevice surfaces of which are provided with a corrosion preventive measure without substantially complicating its manufacture and which are economically advantageous.

A second object of the invention is to provide a chemical apparatus, with which sufficient prevention of crevice corrosion can be expected even under very severe conditions.

A third object of the invention is to provide a method of preventing crevice corrosion and hydrogen absorption in this type of chemical apparatus.

A first feature of the invention for achieving the above objects is to provide a mixed oxide layer composed of an oxide of a platinum group element and an oxide of an anti-corrosion metal on the surface of the titanium material of chemical apparatus at least over those areas constituting the interstitial portions. A second feature of the invention is to provide the said oxide layer over an area no less than 1/1,000, more preferably no less than 1/500, of said titanium material surface. A third feature of the invention is to provide said oxide layer in a thickness no less than 0.01 micron, more preferably no less than 0.1 micron. A fourth feature of the invention is to set the molar ratio of the platinum group element oxide to the anti-corrosion metal oxide in the mixture within the range of from 1 : 99 to 95 : 5, more preferably from 10 : 90 to 95 : 5. A fifth feature of the invention is to provide said oxide layer through thermal treatment in an oxidizing atmosphere. A sixth feature of the invention is to carry out the thermal oxidation treatment of the fifth feature at a temperature ranging from 500° to 700° C and for a period ranging from 10 to 30 minutes. A seventh feature of the invention is to provide said layer on another oxide layer previously formed on the titanium material surface by heating the surface at 500° to 600° C in atmosphere.

DETAILED DESCRIPTION OF THE INVENTION

Figure 1:
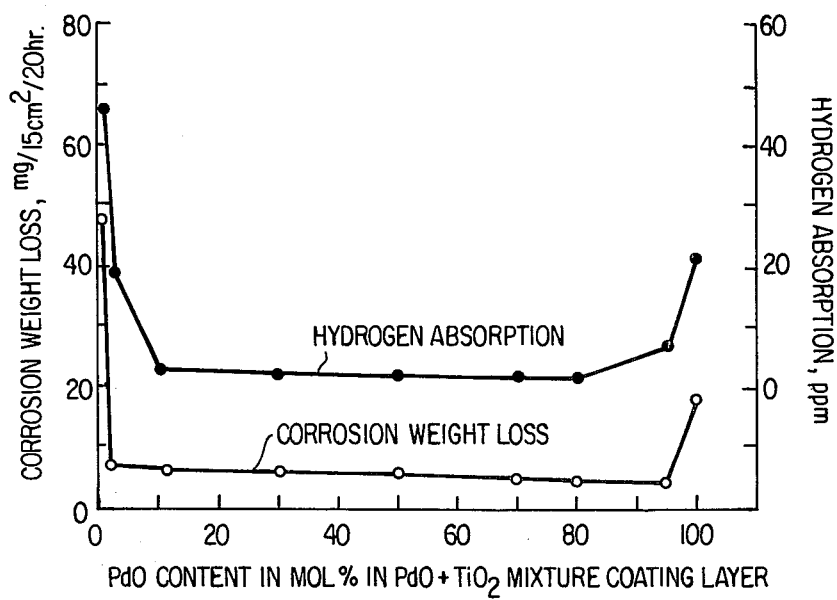
FIG. 1 is a graph showing relation of corrosion and hydrogen absorption of non-treated Ti to the PdO content in mol % in PdO + TiO$_2$ mixture coating layer.

As the titanium material of the chemical apparatus according to the invention may be used such titanium alloys as Ti-5Ta, Ti-6Al-4V, Ti-5Al-2Cr-Fe, Ti5A-2.5Sn, Ti-15Mo-5Zr, Ti-15Mo-5Zr-3Al as well as pure titanium, and it is of course possible to use combination of these alloys. While these titanium materials constitute part or all of the inner surface of the chemical apparatus, part or all of the crevice surfaces must, of course, be constituted by the titanium material as is apparent from the purport of the instant invention.

Examples of the oxide of the platinum group element used according to the invention are those of iridium, platinum, ruthenium, rhodium, palladium and osmium, and from the standpoint of economy palladium oxide is most preferred. While examples of the oxide of the anti-corrosion metal are those of titanium, tantalum, zirconium, niobium, silicon and aluminum, it is possible to use any other oxide of an anti-corrosion metal as well.

The method of covering the chemical apparatus surface of the titanium material with a mixture of oxide composed of a platinum group element oxide and an anti-corrosion metal oxide is not limitative of the invention. The most effective method is to apply, for example, a solution containing a palladium salt and a titanium salt dissolved in a suitable solvent such as alcohol over the titanium material surface at least constituting the crevice portion. The coating is then subjected to a thermal oxidation treatment in an oxidizing atmosphere, for instance in atmosphere, at 200° to 900° C and for 10 to 30 minutes. It is further effective to form a preliminary titanium oxide layer on the Ti surface, which has previously been polished and washed with acid by heating, at 500° to 600° c in the atmosphere prior to the step of coating with the aforementioned solution. Of course, it is possible to coat with a mixture of the oxides directly. While in this case an apparently uniform mixed oxide layer can be obtained, microscopically it has local pinholes which expose the base titanium material. Even in this case, however, the effect of preventing the corrosion of the crevice is not adversely affected by the local microscopic exposure of the titanium material. In the former case, that is, in the method based on oxidation treatment in the atmosphere, the mixed oxide layer is formed on the titanium material surface through chemical reactions. Thus, even if macroscopic defects result in this process, the titanium base in the defective portions is oxidized to form a stable oxide layer, for instance $TiO_2$ layer, so that very reliable suppression of the phenomenon of active dissolution (i.e. corrosion) of the titanium material itself can be advantageously achieved. Electronic spectrum analysis of the structure of the coating layers obtained by these methods reveals that there is some crystallographical coupling between the platinum group element oxide and the anti-corrosion metal oxide. More particularly, the platinum group element oxide is firmly bonded to the titanium material via the anti-corrosion metal oxide, thus providing not only electrochemical corrosion resistance and hydrogen absorption suppressing effect but also excellent mechanical properties such as wear resistance and shock resistance.

While oxides of platinum group elements have generally been known to have good corrosion resisting properties, they have been mainly noted for low threshold value of dissociation in electrolyte liquids (for instance chlorine over-voltage) compared to the pure metals. Their practical application, heretofore known, is as the electrolytic electrode (anode), where the property of anodic reactions is important and no problem is posed in connection with the corrosion of a titanium base. However, in the field of chemical apparatus using Ti-Pd alloys or palladium diffusion treated titanium, it was not known whether or not such apparatus would exhibit sufficient corrosion resistance under such corrosive conditions as where corrosion resistance is otherwise insufficient and also whether corrosion resistance of the titanium base can be ensured with the aforementioned mixed oxide layer. Neither was it totally known as to whether or not such layer has the effect of preventing hydrogen absorption.

The fact that according to the invention excellent corrosion resistance is achieved even under severe corrosive conditions such as those encountered with hydrochloric acid or sulfuric acid is thought to result from the pronounced effect of forming a galvanic couple between the mixed oxide layer and the non-treated titanium surface portion. More particularly, the mixture of platinum group element oxide and the anti-corrosion metal oxide is thought to provide a very noble corrosion potential under the afore-mentioned corrosive conditions. Hence, it has the excellent ability of rendering the galvanically coupled non-treated titanium material anodically polarized into a passive state.

The fact that the effect of preventing hydrogen absorption is improved according to the invention, is thought to be due to the very noble potential developed in the region of the mixed oxide layer coated titanium material in contact with the solution. In other words, while the platinum group element oxide in the mixed oxide layer has the main effect of producing hydrogen when cathode is formed, the speed of diffusion of hydrogen atoms into the anti-corrosion metal oxide in the coating is low enough to suppress the coupling of the hydrogen atoms to the base titanium material. In regions where the mixed oxide layer is not formed only the anodic reactions take place, so that these regions are apparently free from hydrogen absorption.

It is an important part of the invention to provide a mixed oxide layer composed of a platinum group element oxide and a corrosion resisting metal oxide on the surface of Ti material, whereby it is possible to obtain practically perfect prevention of crevice corrosion and tendency of becoming fragile due to hydrogen absorption even under severe conditions. The molar ratio of the platinum group element oxide to the anti-corrosion metal oxide in the mixture ranges from 1 : 99 to 95 : 5, more preferably from 10 : 90 to 95 : 5, as will be understood form an example given hereinunder.

Since the excellent effects can be obtained even with a small proportion of the platinum group element oxide, and also, since only a very small area of the material surface has to be covered with the coating, the economical value of the invention is very great. Where the proportion of the platinum group element oxide is less than 1 mol percent or greater than 95 mol percent, no considerable improvement can be obtained although it is possible to obtain some effect.

The coating layer according to the invention need not be provided over the entire area of the titanium material surface but may be provided only over no less than 1/1,000 of the total area, more preferably no less than 1/500 of the total area. While the thickness of the coating layer is not particularly limited, it is suitably not less than 0.01 micron in case where the improvement of the corrosion resistance is the primary aim and is suitably not less than 0.1 micron in case where the effect of preventing hydrogen absorption is primarily desired. The upper limit of the thickness is not critical, but 3 microns may be thought to be the upper limit because of economics. The thickness may be suitably adjusted by appropriately selecting, for instance, the method, number of times, density, etc. of coating solution containing the platinum group element salt and the corrosion resisting metal salt.

The following examples are given to illustrate the effects of the invention.

EXAMPLE 1

Pure titanium pieces 2 mm in thickness were subjected to sand blast treatment and then washed with hydrochloric acid, and then they were covered with respective PdO/TiO$_2$ mixture layers of compositions listed in Table 1. The resultant wafers were then individually coupled to pure titanium to prepare samples A. Also, there were prepared sample B by coupling PdO coated Ti to Ti, sample C by coupling Pd coated Ti to Ti, sample D by coupling Pd to Ti, sample E of the sole Ti-0.15% Pd alloy, and sample F of the sole Ti. Table 1 shows the results of measurements of the corrosion weight loss and hydrogen absorption of these samples, as measured after immersing them in boiling liquid containing 10% sulfuric acid for 20 hours.

Table 1

| Sample structure | Corrosion weight (mg/15cm$^2$. 20hr) | Hydrogen absorption (ppm) |
| --- | --- | --- |
| A  Ti coupled with PdO/TiO$_2$ (1/99) coated Ti | 4.1 | 6 |
| Ti coupled with PdO/TiO$_2$ (10/90) coated Ti | 4.1 | 0 to 3 |
| Ti coupled with PdO/TiO$_2$ (30/70) coated Ti | 4.0 | 0 to 3 |
| Ti coupled with PdO/TiO$_2$ (95/5) coated Ti | 4.0 | 0 to 3 |
| B  Ti coupled with PdO coated Ti | 25.0 | 20 |
| C  Ti coupled with Pd coated Ti | 27.0 | 28 |
| D  Ti coupled with Pd | 25.0 | 10 |
| E  Ti-0.15 % Pd alloy (alone) | 32.5 | 36 |
| F  Ti (alone) | 1120 | 640 |

Note 1) In the coupled samples the area ratio of Ti to coupled material is 10 : 1.
Note 2) The proportions of PdO and TiO$_2$ in the samples A are in mol %.
Note 3) Figures of the hydrogen absorption in the samples A, B and C represent the hydrogen absorption in non-coated Ti.

It will be seen from Table 1 that the corrosion weight loss and hydrogen absorption are least with the samples A according to the invention.

FIG. 1 shows results of tests conducted under the same conditions with samples coated with PdO-TiO$_2$ mixture layers with various proportions of PdO and TiO$_2$, including the samples A in Table 1.

It will be understood from FIG. 1 that the molar ratio of PdO to TiO$_2$ in the mixture is suitably within a range from 1 : 99 to 95 : 5, more suitably within a range from 10 : 90 to 95 : 5.

EXAMPLE 2

Figure 2:
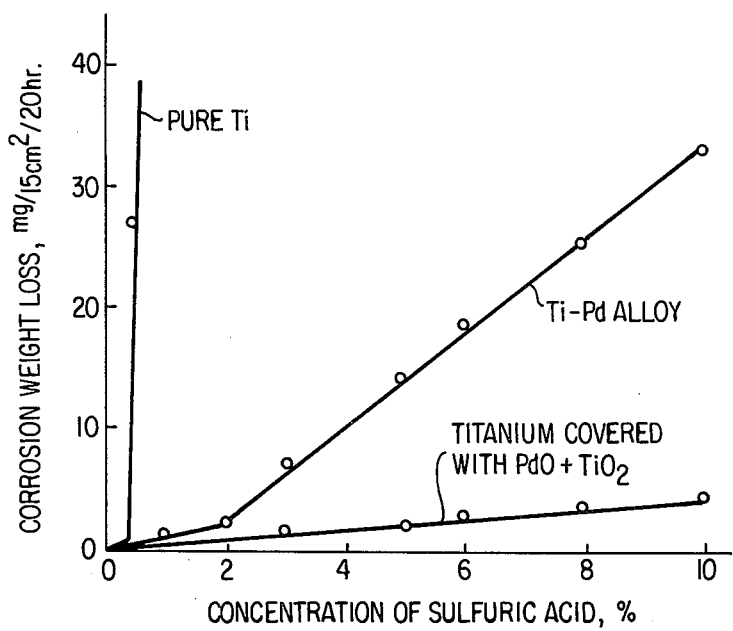
FIG. 2 is a graph showing corrosion in various sulfuric acid concentrations.

Corrosion weight loss of pure Ti, Ti-0.15% Pd alloy and 70 mol % PdO/30 mol % TiO$_2$ mixture coated Ti were measured after immersing the samples in various boiling liquids containing 5 to 10% sulfuric acid for 20 hours, and FIG. 2 shows the results. As is seen from FIG. 2, in case of pure Ti corrosion increased sharply from the sulfuric acid concentration of 0.5%, and in case of Ti-0.15% Pd alloy corrosion began to increase sharply from a concentration of 2% but with less corrosive weight reduction compared to the case of pure Ti. In contrast, the mixture layer coated titanium according to the invention showed excellent corrosion resisting property even at a sulfuric acid concentration of 10%. This steady corrosion resistance offered by the mixture layer coated titaniun over a board sulfuric acid concentration range is presumably owing to low hydrogen overvoltage in the coating layer compared to metallic palladium and also to excellent durability of the layer as the negative electrode.

EXAMPLE 3

Figure 3:
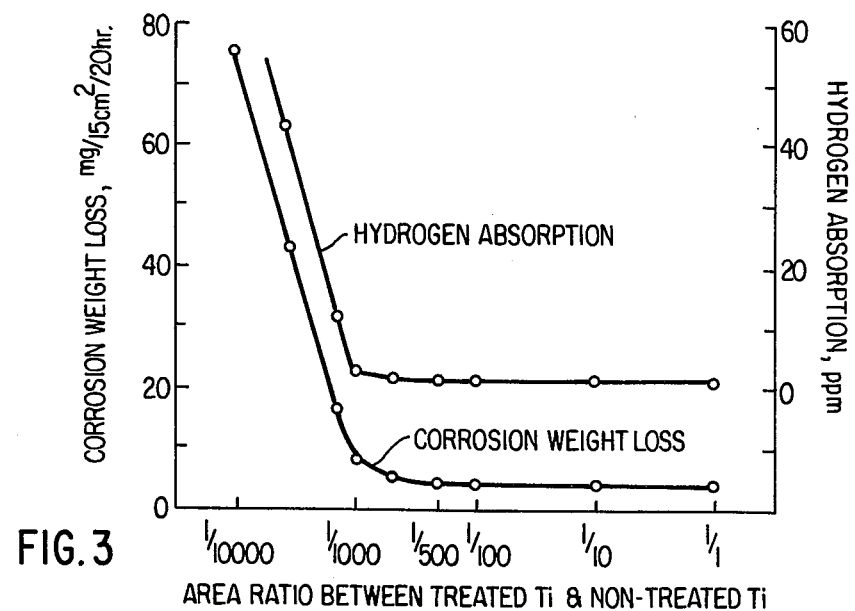
FIG. 3 is a graph showing relation of corrosion and hydrogen absorption of non-treated Ti to the area ratio between treated Ti and non-treated Ti.

Square pieces of titanium material, 25 mm long on each side (with a surface area of 13.5 cm$^2$) and 1 mm in thickness, were covered over the entire surface with a PdO/TiO$_2$ layer (with molar ratio of 70/30) and then coupled by galvanic coupling to non-treated Ti plates of different sizes to prepare samples of different area ratios. These samples were then immersed in boiling 10% sulfuric acid solution for 20 hours, and then the corrosion weight loss and hydrogen absorption of their non-treated Ti were measured to obtain results as shown in FIG. 3. It will be seen that the area ratio of the mixture oxide layer according to the invention to the titanium material may be no less than 1/1,000 for obtaining satisfactory effects of preventing corrosion and hydrogen absorption and no less than 1/500 for obtaining more satisfactory effects.

EXAMPLE 4

Figure 4:
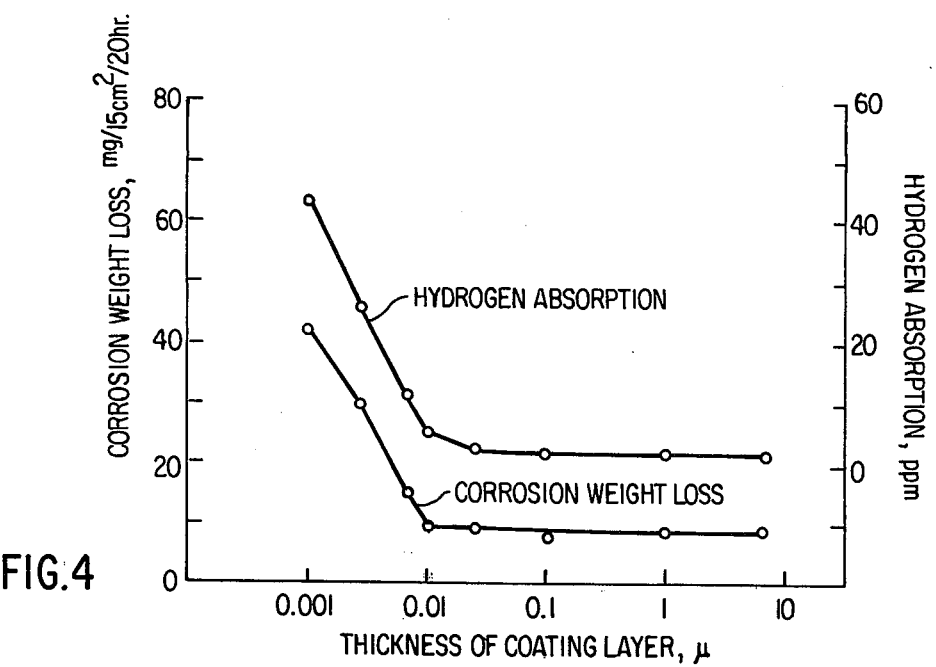
FIG. 4 is a graph showing relation of corrosion and hydrogen absorption of non-treated Ti to the thickness of coating layer.

Square pieces of titanium material, 25 mm long on each side and 1 mm thick, were covered over the surface with PdO/TiO$_2$ layer (with molar ratio of 50/50) to various thicknesses and then individually coupled by galvanic coupling to pure Ti. These samples were then immersed in boiling 10% sulfuric acid solution for 20 hours, and then the corrosion weight loss and hydrogen absorption of their non-treated Ti were measured to obtain results as shown in FIG. 4. It will be seen that satisfactory results are obtainable when the thickness of the coating layer is greater than 0.01 micron, and particularly both corrosion and hydrogen absorption prevention effects are excellent with thickness greater than 0.1 micron.

EXAMPLE 5

Mixture oxide coated titanium samples were prepared by using platinum group element oxides other than PdO and corrosion resisting metal oxides other than TiO$_2$, and their anti-corrosion and hydrogen absorption preventive property were measured under the same conditions as in Example 2 to obtain results as shown in Table 2. (The molar ratio between the platinum group element oxide and corrosion resisting metal oxide was set to 1 :

1, and the area ratio between coated portion and non-coated portion was also set to 1 : 1.)

Table 2

| Sample | Corrosion weight loss (mg/15cm$^2$.) | Hydrogen adsorption (ppm) |
| --- | --- | --- |
| PtO/TiO$_2$ | 4.1 | 0 – 3 |
| RuO$_2$/TiO$_2$ | 4.2 | 0 – 3 |
| IrO$_2$/TiO$_2$ | 4.5 | 0 – 3 |
| RhO$_2$/TiO$_2$ | 4.0 | 0 – 3 |
| OsO$_2$/TiO$_2$ | 6.4 | 0 – 5 |
| PdO/Ta$_2$O$_5$ | 4.0 | 0 – 3 |
| PdO/ZrO$_2$ | 4.1 | 0 – 3 |
| PdO/Nb$_2$O$_5$ | 4.1 | 0 – 3 |
| Contrast PdO/TiO$_2$ | 4.0 | 0 – 3 |

It will be seen from Table 2 that both corrosion resistance and hydrogen absorption resistance were pronounced in all samples except for the sample of O$_s$O$_2$/TiO$_2$, in which slightly high values resulted.

EXAMPLE 6

Pure titanium pieces 2 mm in thickness were washed in the manner as described in Example 1 and then covered with a PdO/TiO mixture layer (with the molar ratio of the components of the layer per to 1 : 1, the thickness of the layer to 1 micron and the area ratio between coated portion and noncoated portion to 1 : 1) under various heating conditions. The layer of mixture oxide was formed by applying a methanol solution containing palladium chloride and titanium chloride dissolved therein over the surface of the piece. Table 3 shows results of measurements of the corrosion weight loss and hydrogen absorption of the samples, the measurement being conducted in the manner as described in Example 1.

Table 3

| Conditions for thermal oxidation | | Corrosion weight loss (mg/15 cm$^2$ . 20 h) | Hydrogen absorption (ppm) |
| --- | --- | --- | --- |
| 1) 300° C | 10 minutes | 28.4 | 28 |
| 2) 500° C | 10 minutes | 4.0 | 0 to 3 |
| 3) 500° C | 30 minutes | 2.2 | 0 to 3 |
| 4) 700° C | 10 minutes | 2.5 | 0 to 3 |
| 5) 900° C | 10 minutes | 19.3 | 17 |
| Contrast | Non-coated Ti | Actively dissolved | 640 |
| | Ti-Pd alloy | 32.5 | 36 |

As is seen from Table 3, the most excellent corrosion resistance and hydrogen absorption resistance were obtained when the thermal oxidation was carried out under conditions of 500° to 700° C and 10 to 30 minutes. At heating temperatures below 300° C the percentage of conversion of Pd into PdO was reduced to result in slightly interior corrosion resistance. Also, the corrosion resistance was slightly reduced with temperature conditions above 900° C.

EXAMPLE 7

Square pieces of titanium material, 25mm long on each side and 1mm in thickness, were covered over the entire surface with a mixture oxide layer which is shown in Table 4 and then coupled by galvanic coupling to nontreated Ti plates of the same size.

These samples were immersed in boiling 10% sulfuric acid solution for 20 hours, and then the corrosion weight loss and hydrogen absorption of their nontreated Ti were measured to obtain results as shown in Table 4.

Table 4

| Sample | Corrosion weight loss (mg/15 cm . 20 hr) | Hydrogen absorption (ppm) |
| --- | --- | --- |
| PdO 30/PtO 20/TiO$_2$50 | 4.3 | 0 – 3 |
| PdO 30/RuO$_2$ 20/TiO$_2$50 | 4.2 | 0 – 4 |
| PdO 70/RuO$_2$ 10/TiO$_2$20 | 4.3 | 0 – 3 |
| PtO 40/IrO$_2$ 20/Ta$_2$O$_5$40 | 4.3 | 0 – 5 |
| RhO$_2$30/RuO$_2$ 10/ZrO$_2$60 | 4.1 | 0– 4 |
| RhO$_2$70/IrO$_2$ 10/TiO$_2$20 | 4.3 | 0 – 3 |
| PdO 40/RuO$_2$ 20/IrO$_2$10/TiO$_2$30 | 4.2 | 0 – 3 |
| PdO 40/TiO$_2$20/Ta$_2$O$_5$40 | 4.3 | 0 – 3 |
| PdO 70/TiO$_2$30 | 4.0 | 0 – 3 |

It will be seen from Table 4 that the prevention of corrosion and hydrogen absorption can be effectively achieved by covering the Ti plate with the mixture oxide composed at least two platinum group elements and an anticorrosion metal or at least two anti-corrosion metals and a platinum group element.

EXAMPLE 8

Figures 5A, 5B:
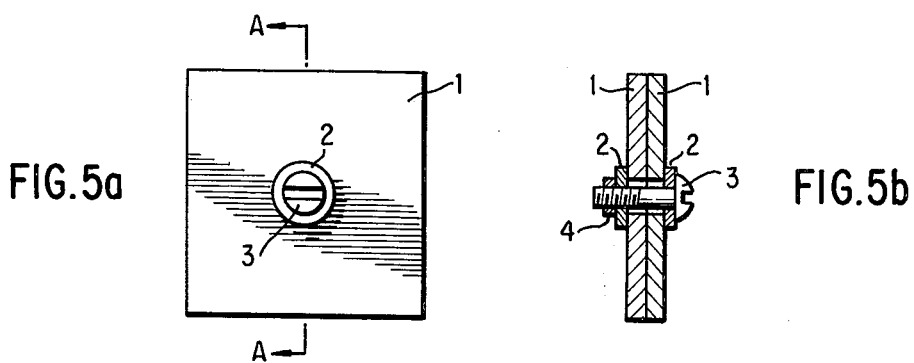
FIG. 5 shows a test piece for providing with crevice corrosion preventive treatment, in plan view in FIG. 5a and in section taken along line A—A in FIG. 5a in FIG. 5b.

Crevice corrosion test pieces were prepared by forming PdO/TiO$_2$ mixture layers (3 microns thick) of various PdO contents on respective inch square piece assemblies consisting of two overlapping thin titanium plates having a central aperture as shown in FIG. 5. In the Figure, designated at 1 is the thin titanium plates, at 2 Teflon insulators, at 3 a titanium bolt, and at 4 a titanium nut. The PdO/TiO$_2$ mixture layer was formed by applying a solution containing palladium chloride and titanium chloride dissolved therein over the surface of each assembly, followed by thermal oxidation in an atmosphere at 550° C for 10 minutes.

The crevice corrosion of the samples prepared in this way was then observed after immersing them in a boiling aqueous solution containing 44% of ammonium chloride for 240 hours, and Table 4 shows the results. A non-coated piece assembly was also tested as contrast in the same manner.

Table 5

| Test specimen | Contrast | Coated specimens | | | | | |
| --- | --- | --- | --- | --- | --- | --- | --- |
| PdO (mol %) in coating layer | — | 0.5 | 1 | 30 | 70 | 95 | 97 |
| Crevice corrosion | Present | Slight | Non | Non | Non | Non | Slight |

As is seen from Table 4, the crevice corrosion was reduced by the provision of the mixture coating layer, and particularly it was suppressed substantially perfectly when the PdO content was 1 to 95%.

As has been described in the foregoing, according to the invention it is possible to achieve reliable prevention of crevice corrosion and hydrogen absorption in a very economical method and also steadily ensure this even under considerably severe corrosive conditions, which is very beneficial in industry in view of the safety and extension of life of chemical apparatus.

What is claimed as new and desired to be secured by letters patent of the United States is:

1. In a chemical apparatus subject to crevice corrosion, having inner surfaces at least partly constituted by titanium material, the improvement which comprises:
  a coating firmly bonded to at least the crevice positions of said inner surfaces by means of an anti-corrosive metal of a mixed oxide layer at least 0.01 microns thick and comprising an oxide of the platinum group and an oxide of an anti-corrosive metal; wherein, the platinum group metal is selected from the group consisting of platinum, iridium, osmium, palladium, rhodium and ruthenium, the anti-corrosive metal is selected from the group consisting of titanium, tantalium, zironium, niobium, silicon and aluminum, the molar ratio of said platinum group oxide to said anti-corrosion metal oxide is within the range of from 1:99 to 95:5, and said mixed oxide layer covers at least 1/1000 of the surface layer of said titanium material.

2. The chemical apparatus of claim 1, wherein said mixed oxide layer is provided over no less than 1/500 of the surface area of said titanium material.

3. The chemical apparatus of claim 1, wherein said molar range is a range from 10 : 90 to 95 : 5.

4. The chemical apparatus of claim 1, wherein said thickness is no less than 0.1 micron.

5. The chemical apparatus of claim 1, wherein said platinum group metal is palladium.

* * * * *